United States Patent
Yeh

(10) Patent No.: US 7,656,058 B2
(45) Date of Patent: Feb. 2, 2010

(54) STRUCTURE OF INVERTER

(76) Inventor: Ming-Hsiang Yeh, 14F, No. 375, Nan-Gang District, Fu De Street, Taipei City (TW)

( * ) Notice: Subject to any disclaimer, the term of this patent is extended or adjusted under 35 U.S.C. 154(b) by 66 days.

(21) Appl. No.: 12/153,383

(22) Filed: May 19, 2008

(65) Prior Publication Data
US 2009/0284075 A1    Nov. 19, 2009

(51) Int. Cl.
*H02J 9/00* (2006.01)
(52) U.S. Cl. ..................................... 307/64
(58) Field of Classification Search .............. 307/64
See application file for complete search history.

(56) References Cited
U.S. PATENT DOCUMENTS
2005/0229016 A1* 10/2005 Addy .................... 713/300
2006/0072262 A1* 4/2006 Paik et al. ................ 361/62

* cited by examiner

*Primary Examiner*—Robert L. Deberadinis
(74) *Attorney, Agent, or Firm*—Rosenberg, Klein & Lee

(57) ABSTRACT

An inverter structure includes a power source and an uninterruptible power supply device. The uninterruptible power supply device includes a power output selector and a constant-current controller built therein. The uninterruptible power supply device has an input terminal connected to the power source and output terminals connectable to external electrical appliance facilities via the power output selector and the constant-current controller. When power is supplied from the power source, the power output selector and the constant-current controller built in the uninterruptible power supply device function to effect distribution of power output to the electrical appliance facilities in accordance with preset condition.

9 Claims, 4 Drawing Sheets

STRUCTURE OF INVERTER

FIELD OF THE INVENTION

The present invention relates to a structure of an inverter, and in particular to a combination of a power source and an uninterruptible power supply device and the uninterruptible power supply device comprises a constant-current controller is capable of scheduling sequence and time period of power supply for being applicable to electrical appliance facilities, computer facilities, escape facilities, lighting facilities, precision instruments, and the likes.

BACKGROUND OF THE INVENTION

With tremendous raise of price of the fossil oils, the desire for environmental protection, automation, and energy saving is getting stronger. Among these, automation is one of the most desired for the modern people. Traditionally, automation is only applied to a device itself and once the supply of power is cut off, the automation fails to work.

Uninterruptible power supply systems are available in the market for supplying supplementary or alternative power supply when power failures occur in the regular supply of power. The conventional uninterruptible power supply system is effective to provide a supplementary power to maintain the operation of electrical appliances, but the power of the uninterruptible power supply system is supplies to all the electrical appliances coupled thereto and there is no decision made as to which electrical appliance should be of the priority to get power supply.

Taking a building as an example, when a fire occurs, the fire fighters will shut down a main power supply switch of the building to cut off the power supply to the building first before rescue operation takes place. However, once the power supply to the building is cut off, all the escaping facilities, emergency lighting, and ventilation facilities get no power for normal operation. This often leads more severe damage and casualty.

In view of the above problems, the present invention is aimed to provide an inverter structure that overcomes the problems.

SUMMARY OF THE INVENTION

An objective of the present invention is to provide an inverter structure that features a combination of a power source and an uninterruptible power supply device, wherein the uninterruptible power supply device comprises a power output selector and a constant-current controller built therein and the power output selector and the constant-current controller function to distribute and regulate power output from the uninterruptible power supply device so as to effect distribution the power output for constant current and thus stabilize the power output for the use by electrical appliance facilities.

Another objective of the present invention is to provide an inverter structure that features a combination of a power source and an uninterruptible power supply device, wherein the uninterruptible power supply device comprises a power output selector and a constant-current controller built therein and the constant-current controller further comprises a timer for timed scheduling of the power output to thereby stabilize the output power for use by electrical appliance facilities.

To realize the above objectives, in accordance with the present invention, an inverter structure comprises a power source and an uninterruptible power supply device. The uninterruptible power supply device comprises a power output selector and a constant-current controller built therein. The uninterruptible power supply device has an input terminal connected to the power source and output terminals connectable to external electrical appliance facilities via the power output selector and the constant-current controller. When power is supplied from the power source, the power output selector and the constant-current controller built in the uninterruptible power supply device function to effect distribution of power output to the electrical appliance facilities in accordance with preset condition.

BRIEF DESCRIPTION OF THE DRAWINGS

The present invention will be apparent to those skilled in the art by reading the following description of a preferred embodiment thereof with reference to the drawings, in which.

DETAILED DESCRIPTION OF THE PREFERRED EMBODIMENTS

Figure 1:
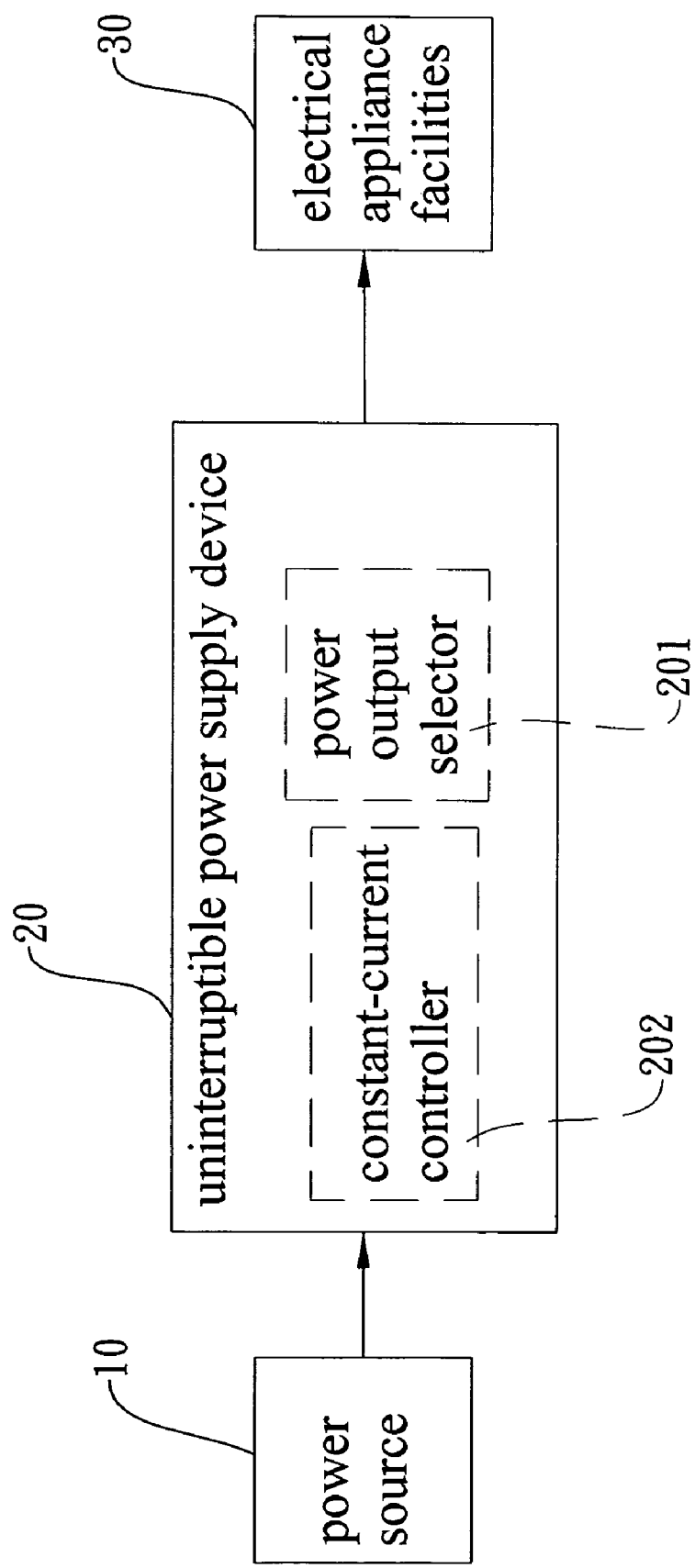
FIG. 1 is a schematic block diagram of an inverter structure in accordance with the present invention.

With reference to the drawings and in particular to FIGS. 1-5, the present invention provides a structure of inverter, which comprises a power source 10, which may include a direct-current (DC) power source and/or an alternate-current (AC) power source, such as electric mains, a bicycle power generator, a fuel power generator, a battery power generator, a wind power generator, a fuel cell power generator, and a solar power generator.

An uninterruptible power supply device 20 has an input terminal connected to the power source 10. The uninterruptible power supply device 20 comprises a power output selector 201 and a constant-current controller 202 built therein. The constant-current controller 202 effects distribution of an output power for constant current purposes and the constant-current controller 202 is connected to the power output selector 201. The uninterruptible power supply device 20 is connected to various electrical appliance facilities 30 via the power output selector 201. The power output selector 201 realizes selection of the output power by means of software, or the selection can be realized directly through hardware, such as relays, reed switches, motors and the likes. And, the power output flows to the electrical appliance facilities 30 are controlled by the constant-current controller 202 to thus realize stable power output and supply.

Figure 3:
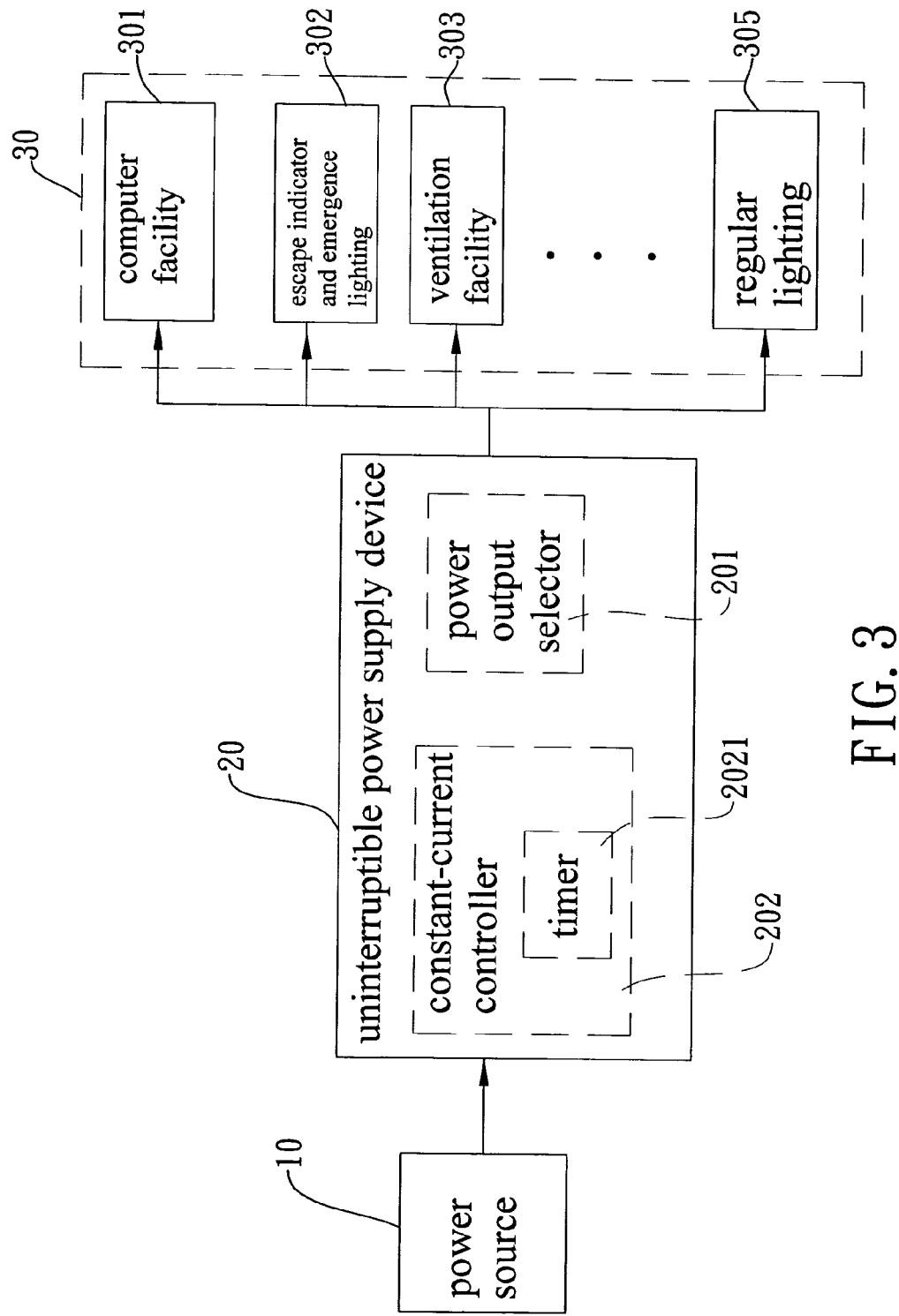
FIG. 3 is a schematic block diagram illustrating an application of the inverter structure of the present invention in accordance with a second embodiment.
Figure 4:
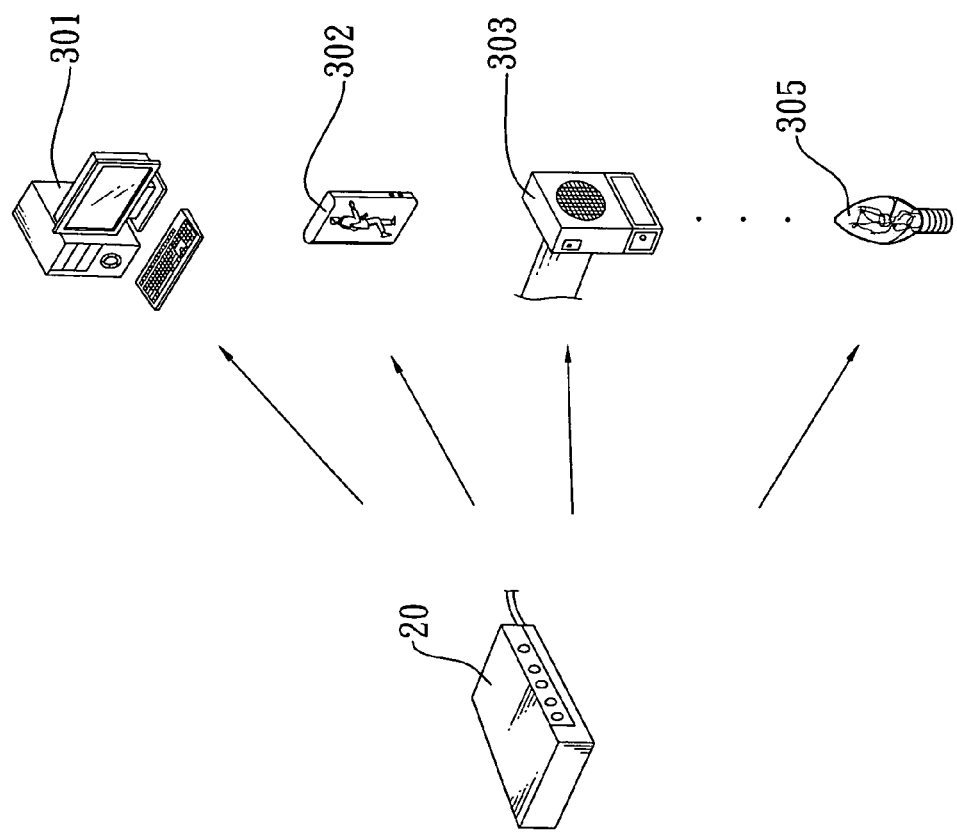
FIG. 4 is a schematic view illustrating the connection of the inverter structure with electrical appliances.

Referring to FIG. 3, the constant-current controller 202 built in the uninterruptible power supply device 20 further comprises a timer 2021, which allows the constant-current controller 202 to not only effect distribution of the output power flow from each power source 10, but also determines, at the time when power supply from the power source 10 stops, those of the electrical appliance facilities 30 should maintain operation and those should be cut off power supply so as to realize timed priority distribution of power supply.

Figure 2:
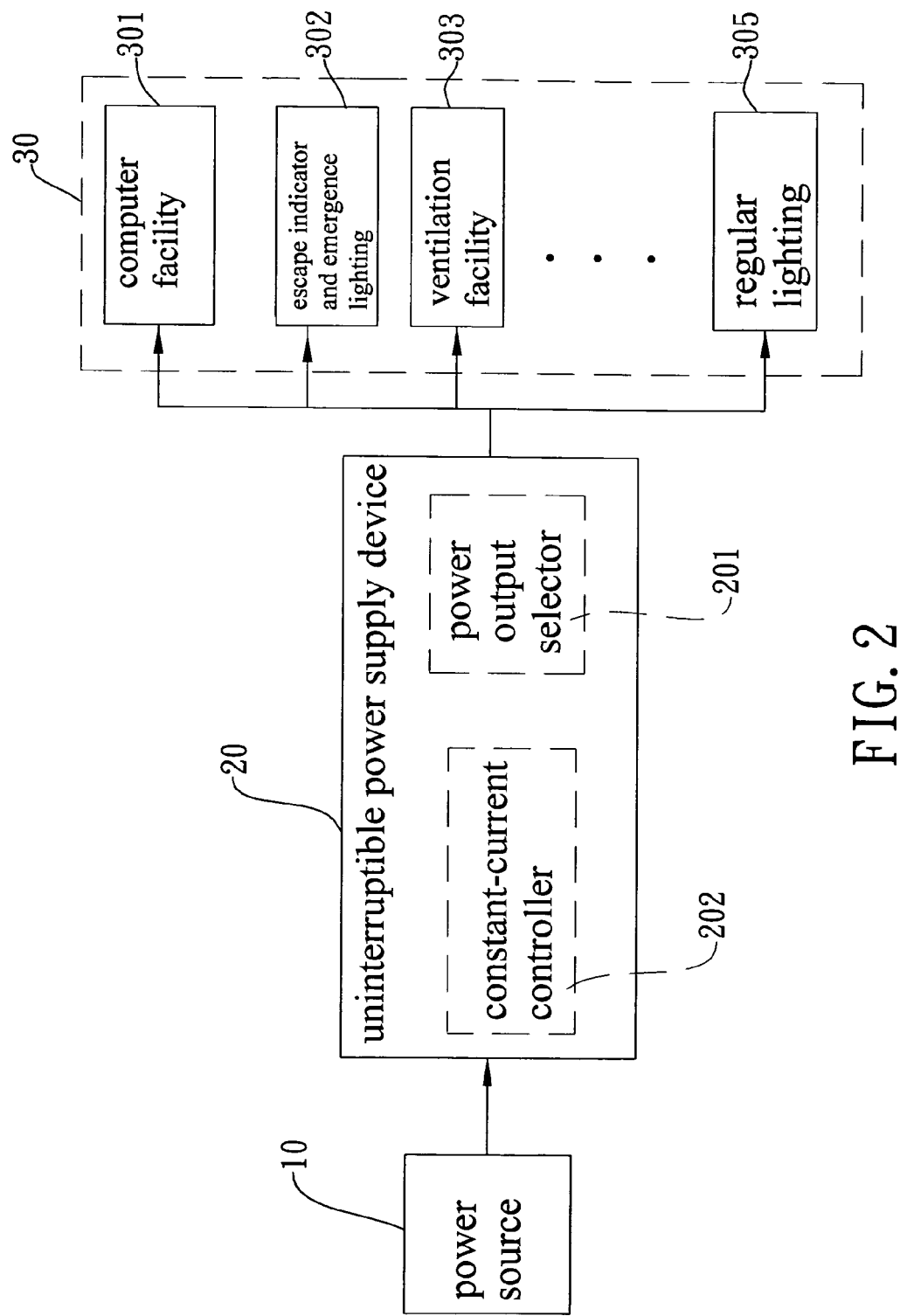
FIG. 2 is a schematic block diagram illustrating an application of the inverter structure of the present invention in accordance with a first embodiment.

The electrical appliance facilities 30 may include a computer facility 301, an escape indicator and emergence lighting 302, a ventilation facility 303, . . . , and a regular lighting 305. As shown in FIG. 2, under regular supply of power from the electrical mains or other power generator of the power source 10 in accordance with the present invention, the uninterruptible power supply device 20 supplies the power to the electrical appliance facilities 30 that are connected to the uninterruptible power supply device 20, and also stores up an excessive portion of the power supplied to the uninterruptible power supply device 20. Under the regular supply of power from the electrical mains and other power generators, the electrical appliance facilities 30 receive the electrical power that is subjected to distribution and supply by the constant-current controller 202 that is built in the uninterruptible power supply device 20 in accordance with a preset sequence or timed scheduling of power supplying. When the electrical mains or the other power generators of the power source 10 stop to supply electrical power, the uninterruptible power supply device 20 outputs the stored electrical power in accordance with the sequence and scheduling set in the constant-current controller 202 that is built therein. The constant-current controller 202 may set a top priority for supplying electrical power to the computer facility 301 to allow the computer facility 301 to have sufficient time to save data and information. Once the time for powering the computer facility 301 runs up, the constant-current controller 202 subsequently supplies power to the escape indicator and emergency lighting 302 and ventilation facility 303. (In practice, the power can be simultaneously supplied to more than one electrical appliance facilities 30.) As such, when accidents happen to a building, the building can still maintain excellent air ventilation and the escape indicator and emergence lighting, without misleading the escape route for people inside the building. Once the time period for powering the escape indicator and emergence lighting 302 and ventilation facility 303 gets over, the power is then supplied to the regular lighting 305.

Further, the power output selector 201 can further comprise wireless remote control for controlling the constant-current controller 202, for example mobile phones, such as GSM, PHS, and CDMA, Bluetooth, RF (radio frequency), WLAN (wireless local area network), and even power line communications (PLC), for realizing control of the power output selector 201 so that a user may select which of the electrical appliance facilities 30 has the priority for being provided with electrical power or stopping supply of power based on his or her discretion of the situation where he or she is in.

Referring to FIGS. 1-4, the structure of inverter in accordance with the present invention features a combination of a power source 10 and an uninterruptible power supply device 20, wherein the uninterruptible power supply device 20 comprises a power output selector 201 and a constant-current controller 202 built therein and the uninterruptible power supply device 20 has output terminals that are connected to various electrical appliance facilities 30 via the power output selector 201 and the constant-current controller 202 and wherein the constant-current controller 202 function to effect distribution of output power to the various electrical appliance facilities 30. It is concluded that the present invention is effective in time-scheduling and constant-current based distribution of the output power to thereby provide stable power output for the use by electrical appliance facilities.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An inverter structure comprising:
   a power source; and
   an uninterruptible power supply device comprising a power output selector and a constant-current controller built therein, the uninterruptible power supply device having an input terminal connected to the power source and output terminals adapted to connect to external electrical appliance facilities via the power output selector and the constant-current controller;
   wherein when power is supplied from the power source, the power output selector and the constant-current controller built in the uninterruptible power supply device function to effect distribution of power output to the electrical appliance facilities in accordance with preset conditions.

2. The inverter structure as claimed in claim 1, wherein the power source selectively comprises direct-current (DC) power sources and alternate-current (AC) power sources.

3. The inverter structure as claimed in claim 1, wherein the power source is selected among electrical mains, power generator, fuel power generation.

4. The inverter structure as claimed in claim 1, wherein the power output selector built in the uninterruptible power supply device is realized by means of software.

5. The inverter as claimed in claim 1, wherein the power output selector built in the uninterruptible power supply device is realized by means of hardware, which selectively comprises one of a relay, a reed switch and a motor.

6. The inverter structure as claimed in claim 1, wherein the power output selector built in the uninterruptible power supply device further comprises a wireless remote control, which is selected among radio frequency devices, mobile phones of GSM, CDMA, PHS, Bluetooth devices, wireless local area network devices.

7. The inverter structure as claimed in claim 1, wherein the power output selector built in the uninterruptible power supply device further comprises a remote control realized by power line communications technology.

8. The inverter as claimed in claim 1, wherein the constant-current controller built in the uninterruptible power supply device functions to distribute the power output for constant current so as to provide stable output of power.

9. The inverter as claimed in claim 1, wherein the constant-current controller of the uninterruptible power supply device comprises a timer for effecting timed control of power output.

* * * * *